United States Patent
Shuck

(10) Patent No.: US 11,571,787 B2
(45) Date of Patent: Feb. 7, 2023

(54) ABRASIVE COATING INCLUDING METAL MATRIX AND CERAMIC PARTICLES

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 225 days.

(21) Appl. No.: 16/717,895

(22) Filed: Dec. 17, 2019

(65) Prior Publication Data

US 2021/0178475 A1  Jun. 17, 2021

(51) Int. Cl.
| | |
|---|---|
| B22F 10/00 | (2021.01) |
| B22F 3/00 | (2021.01) |
| B22F 7/00 | (2006.01) |
| B22F 7/02 | (2006.01) |
| B22F 1/145 | (2022.01) |
| B22F 10/10 | (2021.01) |
| B24D 18/00 | (2006.01) |
| B22F 10/25 | (2021.01) |
| B22F 12/41 | (2021.01) |

(Continued)

(52) U.S. Cl.
CPC .......... *B24D 18/0054* (2013.01); *B22F 1/145* (2022.01); *B22F 3/003* (2013.01); *B22F 7/008* (2013.01); *B22F 7/02* (2013.01); *B22F 10/00* (2021.01); *B22F 10/25* (2021.01); *B22F 10/364* (2021.01); *B22F 10/38* (2021.01); *B22F 12/41* (2021.01); *B22F 2203/00* (2013.01); *B22F 2303/20* (2013.01); *B22F 2999/00* (2013.01)

(58) Field of Classification Search
CPC .......... B22F 10/00; B22F 1/145; B22F 3/003; B22F 7/008; B22F 7/02; B22F 10/10; B22F 2203/00; B22F 2303/20; B22F 2999/00

See application file for complete search history.

(56) References Cited

U.S. PATENT DOCUMENTS

| | | |
|---|---|---|
| 4,751,048 A | 6/1988 | Christodoulou et al. |
| 4,810,314 A | 3/1989 | Henderson et al. |

(Continued)

FOREIGN PATENT DOCUMENTS

| | | |
|---|---|---|
| CA | 2903324 A1 | 9/2014 |
| CA | 2916776 A1 | 7/2016 |

(Continued)

OTHER PUBLICATIONS

Final Office Action from U.S. Appl. No. 16/717,919, dated Jan. 26, 2022, 8 pp.

(Continued)

*Primary Examiner* — Anthony J Zimmer
*Assistant Examiner* — Ricardo D Morales
(74) *Attorney, Agent, or Firm* — Shumaker & Sieffert, P.A.

(57) ABSTRACT

A system may include a powder source; a powder delivery device; an energy delivery device; and a computing device. The computing device may be configured to: control the powder source to deliver metal powder to the powder delivery device; control the powder delivery device to deliver the metal powder to a surface of an abrasive coating; and control the energy delivery device to deliver energy to at least one of the abrasive coating or the metal powder to cause the metal powder to be joined to the abrasive coating.

9 Claims, 6 Drawing Sheets

(51) Int. Cl.
*B22F 10/364* (2021.01)
*B22F 10/38* (2021.01)

(56) References Cited

U.S. PATENT DOCUMENTS

| | | | |
|---|---|---|---|
| 5,141,769 A | 8/1992 | Platz | |
| 5,453,329 A | 9/1995 | Everett et al. | |
| 5,535,905 A | 7/1996 | Harris et al. | |
| 5,660,320 A | 8/1997 | Hoffmuller et al. | |
| 5,837,960 A * | 11/1998 | Lewis | B23K 26/144 |
| | | | 219/121.64 |
| 5,952,110 A | 9/1999 | Schell et al. | |
| 6,599,781 B1 | 7/2003 | Li | |
| 7,063,250 B2 | 6/2006 | Ohara et al. | |
| 7,246,586 B2 | 7/2007 | Hosenfeldt et al. | |
| 8,389,059 B2 | 3/2013 | Kusinski et al. | |
| 8,647,073 B2 | 2/2014 | Hoebel et al. | |
| 8,904,847 B2 | 12/2014 | Shuck | |
| 9,322,100 B2 | 4/2016 | Manier et al. | |
| 9,522,426 B2 | 12/2016 | Das et al. | |
| 10,370,233 B2 | 8/2019 | Shuck et al. | |
| 2001/0014403 A1 * | 8/2001 | Brown | B22F 10/20 |
| | | | 75/235 |
| 2003/0183529 A1 | 10/2003 | Ohara et al. | |
| 2004/0001966 A1 | 1/2004 | Subramanian et al. | |
| 2008/0226843 A1 | 9/2008 | Fukubayashi et al. | |
| 2010/0129636 A1 | 5/2010 | Cybulsky et al. | |
| 2011/0164963 A1 | 7/2011 | Taylor | |
| 2012/0160375 A1 | 6/2012 | Shuck | |
| 2012/0160443 A1 | 6/2012 | Shuck et al. | |
| 2012/0164349 A1 * | 6/2012 | Shuck | B23K 26/34 |
| | | | 427/532 |
| 2014/0230212 A1 | 8/2014 | Shuck | |
| 2016/0229019 A1 | 8/2016 | Shuck et al. | |
| 2017/0029327 A1 | 2/2017 | Jones et al. | |
| 2017/0173733 A1 | 6/2017 | Shuck et al. | |
| 2017/0197270 A1 | 7/2017 | Shuck et al. | |
| 2017/0246705 A1 | 8/2017 | Ribic et al. | |
| 2019/0001427 A1 | 1/2019 | Shuck | |
| 2019/0103378 A1 | 4/2019 | Escher-Poeppel et al. | |
| 2019/0224911 A1 | 7/2019 | Shuck et al. | |
| 2019/0224912 A1 | 7/2019 | Shuck et al. | |

FOREIGN PATENT DOCUMENTS

| | | |
|---|---|---|
| CA | 2975052 A1 | 2/2018 |
| CN | 110079756 A | 8/2019 |
| EP | 0573928 B1 | 9/1998 |
| EP | 2851480 A1 | 3/2015 |
| EP | 2965841 A1 | 1/2016 |
| EP | 2975737 A2 | 1/2016 |
| EP | 3061557 A1 | 8/2016 |
| EP | 3081757 | 10/2016 |
| EP | 3300828 A1 | 4/2018 |
| EP | 3480428 A2 | 5/2019 |
| EP | 3508616 A1 | 7/2019 |
| WO | 200018971 A1 | 4/2000 |

OTHER PUBLICATIONS

Response to Extended Search Report dated May 17, 2021, from counterpart European Application No. 20207962.0 filed Dec. 9, 2021, 47 pp.
Extended Search Report from counterpart European Application No. 20207962.0, dated May 17, 2021, 7 pp.
Response to Office Action dated Jun. 18, 2021, from U.S. Appl. No. 16/717,919, filed Oct. 18, 2021, 8 pp.
Office Action from U.S. Appl. No. 16/717,919, dated Jun. 18, 2021, 9 pp.
Office Action from U.S. Appl. No. 16/717,919, dated May 3, 2022, 8 pp.
Response to Final Office Action dated Jan. 26, 2022, from U.S. Appl. No. 16/717,919, filed Mar. 28, 2022, 7 pp.
Advisory Action from U.S. Appl. No. 16/717,919, dated Apr. 18, 2022, 3 pp.
Response to Office Action dated May 3, 2022 from U.S. Appl. No. 16/717,919, filed Aug. 3, 2022, 11 pp.
Final Office Action from U.S. Appl. No. 16/717,919 dated Nov. 16, 2022, 10 pp.

* cited by examiner

ABRASIVE COATING INCLUDING METAL MATRIX AND CERAMIC PARTICLES

TECHNICAL FIELD

The disclosure relates to abrasive coatings.

BACKGROUND

Systems that use compression of fluids, such as pumps, compressors, turbines, and the like use seals between rotating and static components to improve their functioning, such as efficiency. In low temperature applications, the seals may be formed from materials such as rubber or polymers. In high temperature systems, such as gas turbine engines, rotating components may include an abrasive coating on tips or end walls of the rotating components and adjacent static components may include abradable coatings. During use, the abrasive coating may wear a groove into the abradable coating to form a seal while reducing or substantially preventing damage to the rotating component.

SUMMARY

In some examples, the disclosure describes a method that includes controlling, by a computing device, a powder source to deliver metal powder to a powder delivery device; controlling, by the computing device, the powder delivery device to deliver the metal powder to a surface of an abrasive coating; and controlling, by the computing device, an energy delivery device to deliver energy to at least one of the abrasive coating or the metal powder to cause the metal powder to be joined to the abrasive coating.

In some examples, the disclosure describes a system that includes a powder source; a powder delivery device; an energy delivery device; and a computing device. The computing device is configured to: control the powder source to deliver metal powder to the powder delivery device; control the powder delivery device to deliver the metal powder to a surface of an abrasive coating; and control the energy delivery device to deliver energy to at least one of the abrasive coating or the metal powder to cause the metal powder to be joined to the abrasive coating.

In some examples, the disclosure describes a computer-readable storage device comprising instructions that, when executed, configure one or more processors of a computing device to: control a powder source to deliver metal powder to a powder delivery device; control the powder delivery device to deliver the metal powder to a surface of an abrasive coating; and control an energy delivery device to deliver energy to at least one of the abrasive coating or the metal powder to cause the metal powder to be joined to the abrasive coating.

In some examples, the disclosure describes a method including controlling, by a computing device, an energy delivery device to deliver energy to an abrasive coating, wherein the abrasive coating comprises a metal matrix and abrasive particles at least partially encapsulated by the metal matrix; and controlling, by the computing device, the energy delivery device to scan the energy across a surface of the abrasive coating and form a series of softened or melted portions of the metal matrix.

In some examples, the disclosure is directed to a system that includes an energy delivery device; and a computing device, wherein the computing device is configured to: control the energy delivery device to deliver energy to an abrasive coating, wherein the abrasive coating comprises a metal matrix and abrasive particles at least partially encapsulated by the metal matrix; and control the energy delivery device to scan the energy across a surface of the abrasive coating and form a series of softened or melted portions of the metal matrix.

In some examples, the disclosure describes a computer-readable storage device comprising instructions that, when executed, configure one or more processors of a computing device to: control an energy delivery device to deliver energy to an abrasive coating, wherein the abrasive coating comprises a metal matrix and abrasive particles at least partially encapsulated by the metal matrix; and control the energy delivery device to scan the energy across a surface of the abrasive coating and form a series of softened or melted portions of the metal matrix.

The details of one or more examples are set forth in the accompanying drawings and the description below. Other features, objects, and advantages will be apparent from the description and drawings, and from the claims.

DETAILED DESCRIPTION

Figure 1:
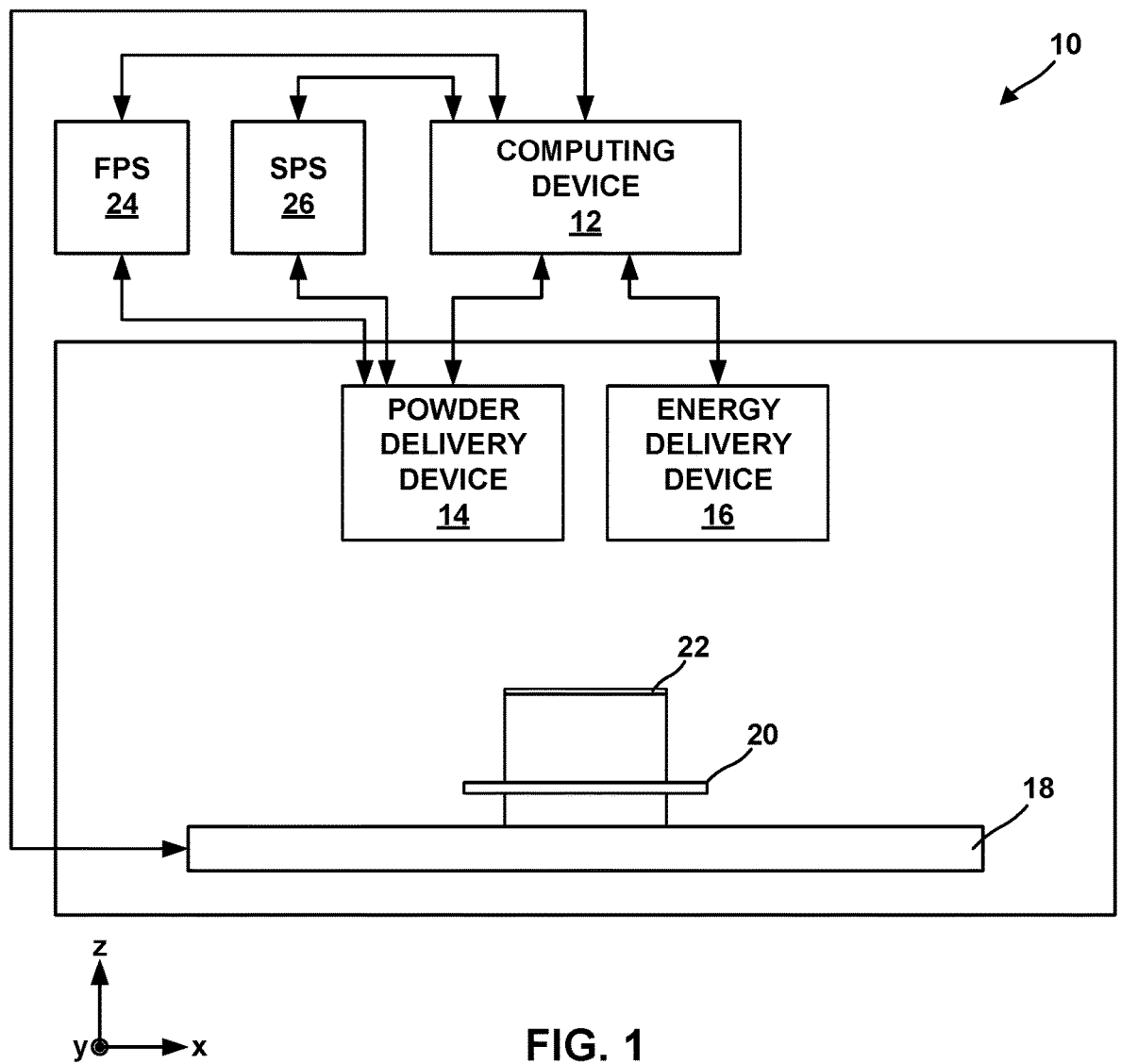
FIG. 1 is a conceptual block diagram illustrating an example system for processing an abrasive coating after deposition of the abrasive coating to improve properties of the abrasive coating.

The disclosure generally describes techniques for forming abrasive coatings that include a metal matrix and ceramic abrasive particles. Some such coatings have been formed using electroplating. However, electroplating limits the alloys that can be used to alloys compatible with electroplating processes. Many of these alloys are relatively low temperature alloys, which limits the systems in which the abrasive coatings can be used.

Other abrasive coatings that include a metal matrix and ceramic abrasive particles have been deposited using additive manufacturing techniques, such as blown powder directed energy deposition. While blown powder directed energy deposition may allow use of alloys that are not compatible with electroplating, abrasive coatings deposited using blown powder directed energy deposition may result in abrasive coatings that are more uneven (e.g., have a higher surface roughness) than abrasive coatings deposited using electroplating. The higher surface roughness may reduce effectiveness as an abrasive coating, as the seal formed by the abrasive coating wearing into an adjacent abradable coating may be less complete. Additionally, or alternatively, the abrasive particles may be less embedded in the metal matrix, leading to a greater chance of the abrasive particles becoming dislodged from the metal matrix and a shorter lifetime of the abrasive coating.

In accordance with some examples of this disclosure, an abrasive coating may be subjected to additional processing after initial deposition to improve properties of the abrasive coating. In some examples, after the abrasive coating is formed on a substrate, directed energy deposition may be used to deposit additional metal matrix material, which further encapsulates the abrasive particles in the abrasive coating, reduces surface roughness, or both. In other examples, after the abrasive coating is formed on a substrate, an energy source, such as a laser or a plasma may be used to soften or melt the metal matrix. The softening or melting of the metal matrix may allow surface tension/surface energy to cause the metal matrix to flow around the abrasive particles and make the height and surface roughness of the abrasive coating more uniform.

In some examples, the additional powder deposition technique and the softening or melting technique may be used together, in either order. For example, after the abrasive coating is formed on a substrate, directed energy deposition may be used to deposit additional metal matrix material. The abrasive coating including the additional metal matrix material then may be softened or melted using a laser or a plasma energy source. As another example, after the abrasive coating is formed on a substrate, the abrasive coating may be softened or melted using a laser or a plasma energy source, then directed energy deposition may be used to deposit additional metal matrix material. In either case, the combination of the two technique may be used to provide lower surface roughness and more uniform height to the abrasive coating, while allowing use of high temperature metal matrices, such as nickel- or cobalt-based superalloys.

FIG. 1 is a conceptual block diagram illustrating an example system 10 for processing an abrasive coating 22 after deposition to improve properties of abrasive coating 22. In the example illustrated in FIG. 1, system 10 includes a computing device 12, a powder delivery device 14, an energy delivery device 16, a stage 18, a first material source (FMS) 24, and an optional second material source (SMS) 24. Computing device 12 is communicatively connected to powder delivery device 14, energy delivery device 16, and stage 18.

Abrasive coating 22 is on a surface or surfaces of component 20. Component 20 may be any component of a mechanical system in which a seal is to be made between component 20 and an adjacent component. For example, component 20 may be a rotating component in a mechanical system, which is adjacent to a stationary component or a counter-rotating component. For instance, component 20 may be a knife seal, a blade (such as a gas turbine engine blade), a wall of a scroll compressor or other compressor or pump, or the like. The adjacent component may include a stator, a runner, a blade track or blade shroud, or the like. In some examples, component 20 is formed from a metal or an alloy, such as a steel (e.g., stainless steel), a nickel-based alloy, a cobalt-based alloy, a titanium-based alloy, or the like.

Abrasive coating 22 may include a metal matrix and abrasive particles. The metal matrix may include any suitable metal or alloy. In some examples, the metal matrix includes a composition that is the same as the composition of component 20. In other examples, the metal matrix includes a composition that is different from the composition of component 20.

In some examples, the metal matrix may include a high-performance metal or alloy, such as a steel (e.g., stainless steel), a nickel-based alloy, a cobalt-based alloy, a titanium-based alloy, or the like. In some examples, the metal matrix may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal matrix may include a polycrystalline nickel-based superalloy or a polycrystalline cobalt-based superalloy, such as an alloy including NiCrAlY or CoNiCrAlY. For example, the metal matrix may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M 247™, from various suppliers. In some examples, the metal matrix may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M 509™, from various suppliers. In some examples, the metal matrix may include an alloy that includes 19 to 21 wt. % Cr, 9 to 11 wt. Ni, 14 to 16 wt. % W, about 3 wt. % Fe, 1 to 2 wt. % Mn, and balance Co, available under the trade designation HAYNES® 25 alloy from Haynes International, Kokomo, Ind. In some examples, a metal matrix may include a chemically modified version of MAR-M 247™ that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal matrix may include a nickel based alloy available under the trade designation IN-738 or INCONEL® 738, or a version of that alloy, IN-738 LC, available from Special Metals Corporation, New Hartford, N.Y., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal matrix may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 or INCONEL® 713 from Special Metals Corporation, New Hartford, N.Y.

In some examples, the metal matrix may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

The abrasive particles may include a ceramic, such as a metal nitride, a metal carbide, a metal oxide, or the like. For example, the abrasive particles may include cubic boron nitride, aluminum oxide, zirconium oxide, silicon carbide, silicon nitride, titanium nitride, zirconium nitride, tantalum nitride, hafnium nitride, or the like.

In some examples, stage 18 is movable relative to energy delivery device 16 and/or energy delivery device 16 is movable relative to stage 18. Similarly, stage 18 may be movable relative to powder delivery device 14 and/or powder delivery device 14 may be movable relative to stage 18. For example, stage 18 may be translatable along at least one axis (e.g., the z-axis shown for purposes of illustration in FIG. 1) to position component 20 relative to energy delivery device 16 and/or powder delivery device 14. Similarly, energy delivery device 16 and/or powder delivery device 14 may be translatable and/or rotatable along at least one axis (e.g., translatable along the x- and y-axes shown in FIG. 1) to position energy delivery device 16 and/or powder delivery device 14, respectively, relative to component 20. Stage 18 may be configured to selectively position and restrain component 20 in place relative to stage 18 during manufacturing and/or processing of abrasive coating 22.

Powder delivery device 14 may be configured to deliver material to the location of abrasive coating 22. In some examples, the material may be supplied by powder delivery device 14 in powder form, e.g., as a metal powder, an abrasive powder, or a mixture of metal powder and abrasive powder.

In some examples, system 10 may be a blown powder directed energy deposition system. In some such systems, powder delivery device 14 may deliver the powder adjacent to the surface of component 20 and/or abrasive coating 22 by blowing the powder in a powder stream adjacent to the surface, e.g., as a mixture of the powder with a gas carrier. In some examples, powder delivery device 14 thus may be fluidically coupled to a material source (such as first material source 24) that provides a fluidized powder (e.g., a powder carried in a gas), and powder delivery device 14 may include at least one nozzle or other mechanism for directing the powder stream to a particular location adjacent component 20. In some examples, powder delivery device 14 may be mechanically coupled or attached to energy delivery device 16 to facilitate delivery of powder and energy for heating the powder or a location of component 20 and/or abrasive coating 22 at or near where the powder is delivered.

In other examples, system 10 may be a powder bed directed energy deposition system. In some such examples, powder delivery device 14 may deliver the powder adjacent to the surface of component 20 and/or abrasive coating 22 by spreading the powder on the surface of component 20 and/or abrasive coating 22, such that the powder rests on the surface prior to the powder, component 20 and/or abrasive coating 22 being heated. In some examples of a powder bed additive manufacturing system, powder delivery device 14 may include a device that spreads the powder or can otherwise manipulate the powder to move the powder within system 10.

In some examples, powder delivery device 14 may be coupled to a single material source, e.g., first material source 24. First material source 24 may include a source of a mixture of the metal powder and the abrasive powder. Thus, to deposit abrasive coating 22, computing device 12 may be configured to control first material source 24 to deliver the mixture of the metal powder and the abrasive powder to powder delivery device 14, which computing device 12 controls to deliver the mixture of the metal powder and the abrasive powder to component 20 to deposit abrasive coating 22.

In some examples, powder delivery device 14 may couple to two material sources. In some implementations, first material source 24 may include a source of metal powder and second material source 26 may include a source of abrasive powder. Thus, to deposit abrasive coating 22, computing device 12 may be configured to control first material source 24 to deliver the metal powder and control second material source 26 to deliver the abrasive powder to powder delivery device 14, which computing device 12 controls to deliver the mixture of the metal powder and the abrasive powder to component 20 to deposit abrasive coating 22.

In other implementations, first material source 24 may include a source of metal powder mixed with abrasive powder and second material source 26 may include a source of metal powder. Thus, to deposit abrasive coating 22, computing device 12 may be configured to control first material source 24 to deliver the mixture of the metal powder and the abrasive powder to powder delivery device 14, which computing device 12 controls to deliver the mixture of the metal powder and the abrasive powder to component 20 to deposit abrasive coating 22. Computing device may be configured to control second material source 26 to deliver the metal powder to powder delivery device 14 during further processing of abrasive coating 22 to deposit additional metal matrix.

The metal powder may include any suitable metal or alloy configured to form a metal matrix in which abrasive particles are at least partially encapsulated. For example, the metal powder may include any of the metals or alloys described above with respect to the metal matrix.

The abrasive powder may include ceramic particles, such as a metal nitride, a metal carbide, a metal oxide, or the like. For example, the abrasive powder may include boron nitride, aluminum oxide, zirconium oxide, silicon carbide, silicon nitride, titanium nitride, zirconium nitride, tantalum nitride, hafnium nitride, or the like.

Energy delivery device 16 may include an energy source, such as a laser source, an electron beam source, plasma source, or another source of energy that may be absorbed by component 20, the metal powder, and/or the metal matrix of abrasive coating 22. Example laser sources include a CO laser, a $CO_2$ laser, a Nd:YAG laser, or the like. In some examples, the energy source may be selected to provide energy with a predetermined wavelength or wavelength spectrum that may be absorbed by component 20, the metal powder, and/or the metal matrix of abrasive coating 22. Similarly, the energy source may be selected to provide a powder and energy density (e.g., energy per unit focal volume) sufficient to soften and/or melt component 20, the metal powder and/or the metal matrix of abrasive coating 22.

In some examples, energy delivery device 16 also includes an energy delivery head, which is operatively connected to the energy source. The energy delivery head may aim or direct the energy toward predetermined positions adjacent to and/or within a volume of component 20 and/or abrasive coating 22 during the processing technique. As described above, in some examples, the energy delivery head may be movable in at least one dimension (e.g., translatable and/or rotatable) under control of computing device 12 to direct the energy toward a selected location adjacent to d/or within a volume of component 20 and/or abrasive coating 22.

Computing device 12 may include, for example, a desktop computer, a laptop computer, a workstation, a server, a mainframe, a cloud computing system, or the like. Computing device 12 is configured to control operation of system 10, including, for example, powder delivery device 14, energy delivery device 16, stage 18, first material source 24, and/or second material source 26. Computing device 12 may be communicatively coupled to powder delivery device 14, energy delivery device 16, stage 18, first material source 24, and/or second material source 26 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Computing device 12 may be configured to control operation of powder delivery device 14, energy delivery device 16, and/or stage 18 to position component 20 and/or abrasive coating 22 relative to powder delivery device 14 and/or energy delivery device 16. For example, as described above, computing device 12 may control stage 18, powder delivery device 14, and/or energy delivery device 16 to translate and/or rotate along at least one axis to position component 20 and/or abrasive coating 22 relative to powder delivery device 14 and/or energy delivery device 16. Positioning component 20 and/or abrasive coating 22 relative to powder delivery device 14 and/or energy delivery device 16 may include positioning a predetermined surface (e.g., a surface to which material is to be added, a surface which is to be re-melted, or the like) of component 20 and/or abrasive coating 22 in a predetermined orientation relative to powder delivery device 14 and/or energy delivery device 16.

In accordance with some examples of this disclosure, computing device 12 may be configured to control system 10 to subject abrasive coating 22 to additional processing after initial deposition of abrasive coating 22 to improve properties of abrasive coating 22. In some examples, after abrasive coating 22 is formed on component 20 (e.g., a glade tip, knife tip, or the like), computing device 12 may be configured to control powder delivery device 14 and energy delivery device 16 to perform directed energy deposition to deposit additional metal matrix material, which further encapsulates the abrasive particles in the abrasive coating, reduces surface roughness, or both. During the deposition of additional metal matrix material, computing device 12 may control a material source (e.g., first material source 24 or second material source 26, depending on the powder that the material source provides) to provide metal powder to powder delivery device 14. Computing device 12 also may control powder delivery device 14 to provide the metal powder to a surface of abrasive coating 22 and control energy delivery device 16 to delivery energy at or near a surface of abrasive coating 22 to soften or melt the metal powder and/or the metal matrix near the location at which powder delivery device 14 is delivering the metal powder to cause the metal powder to be added to the metal matrix. This may build up metal matrix around the abrasive particles, increasing encapsulation of the abrasive particles in the metal matrix and reducing surface roughness of abrasive coating 22. This may lead to greater durability for abrasive coating 22 (due to reduced loss of abrasive particles during abrasion of an adjacent surface), reduced surface roughness (which may result in a better seal between component 20 and an adjacent component), or the like.

In other examples of the disclosure, after abrasive coating 22 is formed on component 20, computing device 12 may control energy delivery device 16 to soften or melt the metal matrix of abrasive coating 22, without delivery of additional metal matrix. The softening or melting of the metal matrix of abrasive coating 22 may allow surface tension/surface energy to cause the metal matrix to flow around the abrasive particles and make the height and surface roughness of abrasive coating 22 more uniform.

In some examples, computing device 12 may be configured to perform both the additional powder deposition technique and the softening or melting technique, in either order. In either order, the combination of the two technique may be used to provide lower surface roughness and more uniform height to abrasive coating 22, while allowing use of high temperature metal matrices, such as nickel- or cobalt-based superalloys.

Figure 2:
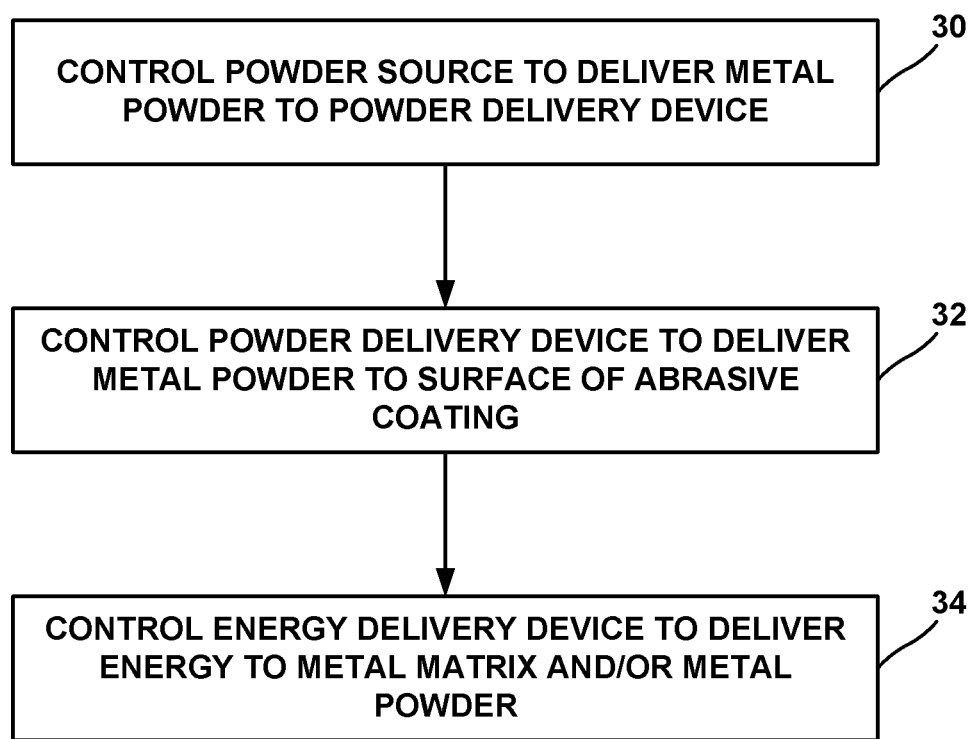
FIG. 2 is a flow diagram illustrating an example technique for processing an abrasive coating after deposition of the abrasive coating to improve properties of the abrasive coating.

An example technique that may be implemented by system 10 will be described with concurrent reference to FIG. 2. FIG. 2 is a flow diagram illustrating an example technique for processing an abrasive coating after deposition of the abrasive coating to improve properties of the abrasive coating. Although the technique of FIG. 2 is described with respect to system 10 of FIG. 1 and component 20 of FIG. 3, in other examples, the technique of FIG. 2 may be performed by other systems, such as systems including fewer or more components than those illustrated in FIG. 1. Similarly, system 10 may be used to performed other techniques (e.g., the technique illustrated in FIGS. 4 and 5).

The technique of FIG. 2 includes controlling, by computing device 12, a material source (e.g., second material source 26) to deliver metal powder to powder delivery device 14 (30). For example, computing device 12 may be configured to control at least one of a valve, a pump, or the like to enable flow of fluidized powder with a selected flow rate of metal powder from second material source 26 to powder delivery device 14. As described above, the metal powder may include any suitable metal for forming a metal matrix of an abrasive coating. In the example of FIG. 2, abrasive particles may be omitted, as an abrasive coating is already present on the surface of the article being processed.

Figure 3:
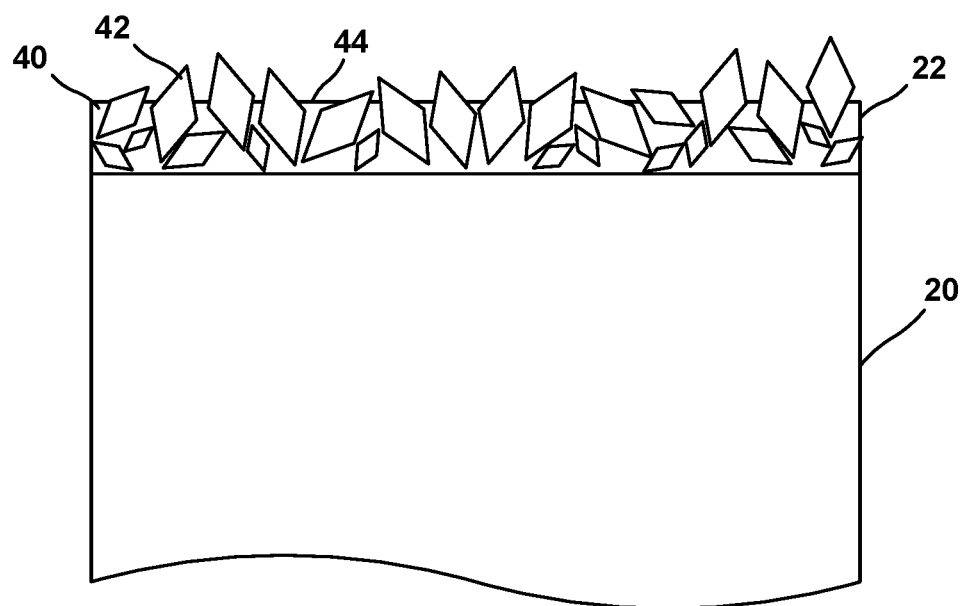
FIG. 3 is a conceptual diagram illustrating an example article including an abrasive coating.

The technique of FIG. 2 also includes controlling, by computing device 12, powder delivery device 14 to deliver the metal powder to a surface 44 of abrasive coating 22 (32; see FIG. 3). Computing device 12 may control powder delivery device 14 to move relative to component 20 so that metal powder is delivered to selected location(s) of the surface 44 of abrasive coating 22. Additionally, computing device 12 may control stage 18 to position component 20 relative to powder delivery device 14.

Concurrently, the technique of FIG. 2 further includes controlling, by computing device 12, energy delivery device 16 to deliver energy to metal matrix 40 and/or the metal powder to cause the metal powder to be added to metal matrix 40 at surface 44 (34). Computing device 12 may control the power, spot size, scanning rate, frequency, pulse duration, and the like of the energy output by energy delivery device 16 to control the energy delivered to metal matrix 40 and/or the metal powder so that the metal powder is joined to metal matrix 40. For example, computing device 12 may control the power, spot size, scanning rate, frequency, pulse duration, and the like of the energy output by energy delivery device 16 to cause the energy to melt portions of metal matrix 40 to form a melt pool, to which the metal power is added upon the metal powder impacting the melt pool. For instance, computing device 12 may be configured to control operation and movement of powder delivery device 14, energy delivery device 16, stage 18, or both, based on a computer aided manufacturing or computer aided design (CAM/CAD) file. The CAM/CAD file may define one or more operating parameters of powder delivery device 14, energy delivery device 16 and/or stage 18 such as, for example, the powder flow rate (e.g., mass flow rate, volumetric flow rate, or the like) of metal powder delivered by powder delivery device 14; the tool path (e.g., scanning pattern), scanning velocity, and other movement parameters of powder delivery device 14; power, spot size, frequency, pulse duration, and the like of the energy output by energy delivery device 16; the tool path (e.g., scanning pattern), scanning velocity, and other movement parameters of energy delivery device 16; the movement parameters of stage 18; or the like.

Computing device 12 may control energy delivery device 16 to move the energy across surface 40 of abrasive coating 22 in concert with controlling powder delivery device 14 such that metal powder is added at locations across surface 40.

In this way, computing device 12 may be configured to control system 10 to add additional metal matrix 40 to an already-present abrasive coating 22. As described above, during initial formation of abrasive coating 22, abrasive particles 44 may tend to project from metal matrix 40 as abrasive particles 44 may be less dense than metal matrix 40 (and thus buoyant in the melt form of metal matrix 40). By further processing abrasive coating 22 by depositing addition metal matrix without additional abrasive particles, the additional metal matrix 40 may further encapsulate abrasive particles 44 in abrasive coating 22. This may reduce surface roughness of abrasive coating 22, improve incorporation of abrasive particles 44 in abrasive coating 22 such that abrasive particles 44 are less likely to be removed from abrasive coating 22 due to contact with an adjacent abradable coating, or both. Reduced surface roughness may improve a seal between a rotating component that includes multiple rotating elements and an adjacent stator or sealing component.

Figure 4:
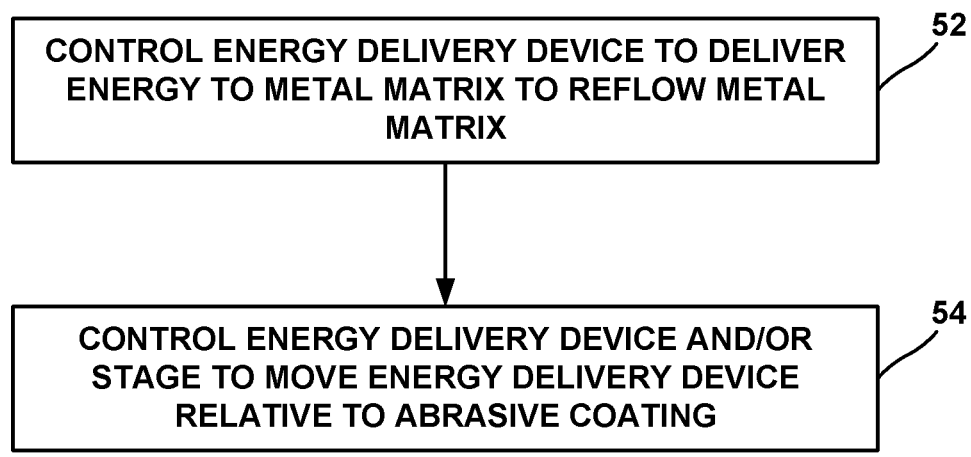
FIG. 4 is a flow diagram illustrating an example technique for processing an abrasive coating after deposition of the abrasive coating to improve properties of the abrasive coating.

In some examples, further processing of abrasive coating 22 may omit any additional material delivery. FIG. 4 is a flow diagram illustrating an example technique for processing an abrasive coating after deposition of the abrasive coating to improve properties of the abrasive coating. Although the technique of FIG. 4 is described with respect to system 10 of FIG. 1 and component 20 of FIG. 3, in other examples, the technique of FIG. 4 may be performed by other systems, such as systems including fewer or more components than those illustrated in FIG. 1. Similarly, system 10 may be used to performed other techniques (e.g., the technique illustrated in FIGS. 2 and 5).

During the technique of FIG. 4, system 10 may delivery no additional material to abrasive coating 22. Instead, system 10 may use energy delivery device 16 to soften or re-melt one or more portions of metal matrix 40 to allow metal matrix 40 to flow and reduce surface roughness of abrasive coating 22.

The technique of FIG. 4 includes controlling, by computing device 12, energy delivery device 16 to delivery energy to metal matrix 40 to soften or melt portions of metal matrix 40 (52). Computing device 12 may control the power, spot size, scanning rate, frequency, pulse duration, and the like of the energy output by energy delivery device 16 to control the energy delivered to metal matrix 40 such that portions of metal matrix 40 absorb sufficient energy to soften or melt. The energy delivered to any selected portion may be selected so that softening or melting is relatively localized, e.g., so that abrasive particles 42 do not have sufficient mobility to flow from abrasive coating 22 and/or metal matrix 40 does not flow from its position on component 20. During this process, in systems that include powder delivery device 14, computing device 12 may be configured to control powder delivery device 14 to not deliver powder to surface 44, or computing device 12 may be configured to not cause powder delivery device 14 to deliver powder to surface 44.

Computing device 12 also may control energy delivery device 16 and/or stage 18 to move energy delivery device 16 relative to abrasive coating 22 (54). More particularly, computing device 12 may control energy delivery device 16 and/or stage to move the energy (e.g., focal spot of an energy beam, central portion of a plasma plume, or the like) relative to surface 44 of abrasive coating 22. Computing device 12 may control energy delivery device 16 and/or stage 18 to move in a selected pattern and rate to move the energy (e.g., focal spot of an energy beam, central portion of a plasma plume, or the like) relative to surface 44 of abrasive coating 22 to expose portions of abrasive coating 22 to a selected power and energy density to cause the selected softening and/or melting of metal matrix 40.

For example, computing device 12 may be configured to control operation and movement of energy delivery device 16, stage 18, or both, based on a computer aided manufacturing or computer aided design (CAM/CAD) file. The CAM/CAD file may define one or more operating parameters of energy delivery device 16 and/or stage 18 such as, for example, power, spot size, frequency, pulse duration, and the like of the energy output by energy delivery device 16; the tool path (e.g., scanning pattern), scanning velocity, and other movement parameters of energy delivery device 16; the movement parameters of stage 18; or the like.

In this way, system 10 may be used to process an abrasive coating using energy delivery to soften or remelt metal matrix 40 after deposition of abrasive coating 22. The softening or melting of metal matrix 40 may allow surface tension/surface energy to cause metal matrix 40 to flow around abrasive particles 42 and make the height and surface roughness of abrasive coating 22 more uniform. This may reduce surface roughness of abrasive coating 22, improve incorporation of abrasive particles 44 in abrasive coating 22 such that abrasive particles 44 are less likely to be removed from abrasive coating 22 due to contact with an adjacent abradable coating, or both. Reduced surface roughness may improve a seal between a rotating component that includes multiple rotating elements and an adjacent stator or sealing component.

Figure 5:
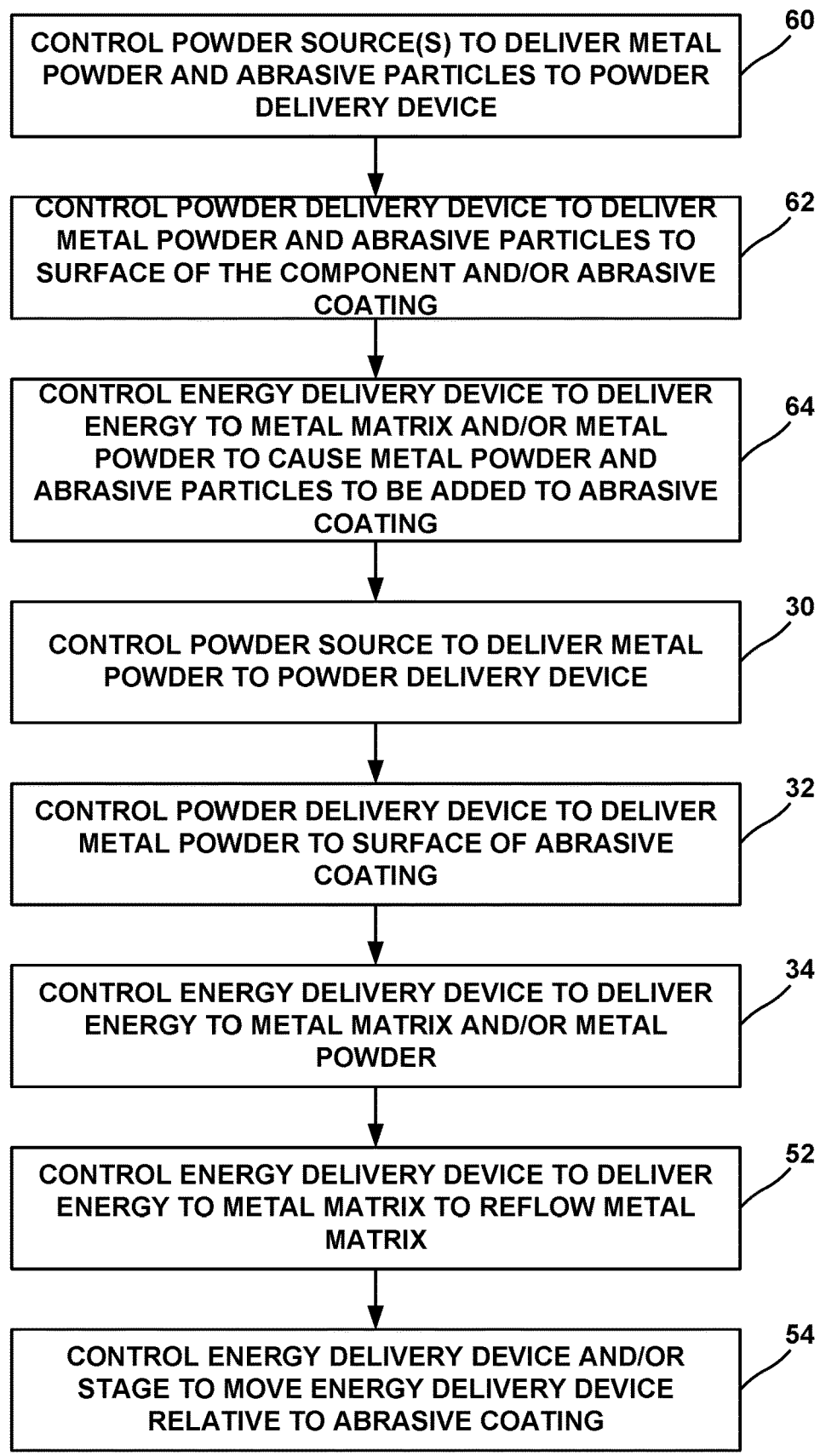
FIG. 5 is a flow diagram illustrating an example technique for processing forming an abrasive coating using directed energy deposition material addition an abrasive coating after deposition of the abrasive coating to improve properties of the abrasive coating.

In some examples, the techniques of FIG. 2 and FIG. 4 may be used together, along with initial deposition of an abrasive coating, to form a finished abrasive coating. FIG. 5 is a flow diagram illustrating a technique for forming an abrasive coating using directed energy deposition material addition and post-processing the abrasive coating to improve properties of the abrasive coating. Although the technique of FIG. 5 is described with respect to system 10 of FIG. 1 and component 20 of FIG. 3, in other examples, the technique of FIG. 5 may be performed by other systems, such as systems including fewer or more components than those illustrated in FIG. 1. Similarly, system 10 may be used to performed other techniques (e.g., the technique illustrated in FIGS. 2 and 4).

The technique of FIG. 5 includes controlling, by computing device 12, one or more material sources to deliver metal powder and abrasive particles to powder delivery device 14

(60). As described above with reference to FIG. 1, in some examples a single material source (e.g., first material source 24) is configured to provide a mixture of metal powder and abrasive particles. In other examples, a first material source 24 is configured to provide metal powder and second material source is configured to provide abrasive particles. Thus, computing device 12 may control one or more materials sources to cause the one or more material sources to delivery metal powder and abrasive particles to powder delivery device 14 (60).

Computing device 12 may control the one or more material sources to deliver metal powder and abrasive particles to powder delivery device 14 in a selected ratio to result in a selected concentration of abrasive powder 42 in the metal matrix 40 of abrasive coating 22. For example, computing device 12 may control opening and closing of one or more valves or other flow control devices to control the flow rate of fluidized powder from the one or more material sources to powder delivery device 42.

Computing device 12 also may control powder delivery device 14 to deliver the mixture of metal powder and abrasive particles to the surface of component 20 and/or abrasive coating 22 (62). Computing device 12 may control powder delivery device 14 to move relative to component 20 so that metal powder and abrasive particles are delivered to selected location(s) of the surface on which abrasive coating 22 is to be formed. Additionally, computing device 12 may control stage 18 to position component 20 relative to powder delivery device 14.

Concurrently, the technique of FIG. 5 further includes controlling, by computing device 12, energy delivery device 16 to deliver energy to a surface of component 20, metal matrix 40 and/or the metal powder to cause the metal powder and abrasive particles to be joined to component 20 to form abrasive coating 22 (64). Computing device 12 may control the power, spot size, scanning rate, frequency, pulse duration, and the like of the energy output by energy delivery device 16 to control the energy delivered to metal matrix 40 and/or the metal powder so that the metal powder is joined to metal matrix 40, resulting in the abrasive particles being incorporated in abrasive coating 22. For example, computing device 12 may control the power, spot size, scanning rate, frequency, pulse duration, and the like of the energy output by energy delivery device 16 to cause the energy to melt portions of component 20 and/or metal matrix 40 to form a melt pool, to which the metal power is added upon the metal powder impacting the melt pool and which abrasive particles impact and are incorporated. For instance, computing device 12 may be configured to control operation and movement of powder delivery device 14, energy delivery device 16, stage 18, or both, based on a computer aided manufacturing or computer aided design (CAM/CAD) file. The CAM/CAD file may define one or more operating parameters of powder delivery device 14, energy delivery device 16 and/or stage 18 such as, for example, the powder flow rate (e.g., mass flow rate, volumetric flow rate, or the like) of metal powder and abrasive particles delivered by powder delivery device 14; the tool path (e.g., scanning pattern), scanning velocity, and other movement parameters of powder delivery device 14; power, spot size, frequency, pulse duration, and the like of the energy output by energy delivery device 16; the tool path (e.g., scanning pattern), scanning velocity, and other movement parameters of energy delivery device 16; the movement parameters of stage 18; or the like.

Computing device 12 may control energy delivery device 16 to move the energy across surface 40 of abrasive coating 22 in concert with controlling powder delivery device 14 such that metal powder and abrasive particles are added at locations across a surface of component 20 to form abrasive coating 22.

Computing device 12 may continue controlling powder source(s) (60), controlling powder delivery device 14 (62), and controlling energy delivery device 16 (64) until sufficient material (metal powder and abrasive particles) has been deposited to form abrasive coating 22. As such, computing device may control powder delivery device 14 and energy delivery device 16 to cause the powder stream and energy to follow a tool path that defines a pattern (e.g., of adjacent rows) along the surface of component 20, then control powder delivery device 14 and energy delivery device 16 to cause the powder stream and energy to follow a tool path that defines a pattern (e.g., of adjacent rows) along a surface of the previously deposited layer until a desired thickness of material (metal power and abrasive particles) has been deposited on component 20 to form abrasive coating 22.

Once system 10 has formed abrasive coating 22, system 10 may be used to post-process abrasive coating 22 to improve properties (e.g., surface roughness, incorporation of abrasive particles, or both) using the techniques of FIGS. 2 and 4. Although FIG. 5 illustrates the technique of FIG. 2 being performed before the technique of FIG. 4, in other examples, the technique of FIG. 4 may be performed before the technique of FIG. 2. In the example of FIG. 5, computing device 12 may control one or more a powder source to deliver metal powder to powder delivery device 14 (30), control powder delivery device to deliver the metal powder to surface 44 of abrasive coating 22 (32), and, concurrently, control energy delivery device 16 to deliver energy to metal matrix 40 and/or the metal powder to cause the metal powder to be added to metal matrix 40 (34). Computing device 12 also may control energy delivery device 16 to deliver energy to metal matrix 40 to cause metal matrix 40 to soften or flow (without delivering metal powder to the surface of metal matrix) (52) and control energy delivery device 16 and/or stage 18 to move energy delivery device 16 relative to abrasive coating 22 such that energy is scanned across surface 40 of abrasive coating.

In this way, system 10 may be used to process abrasive coating 22 by delivering additional metal matrix to abrasive coating 22 to further encapsulate previously deposited abrasive particles and by using energy delivery to soften or remelt metal matrix 40 after deposition of abrasive coating 22 (in either order). The softening or melting of metal matrix 40 may allow surface tension/surface energy to cause metal matrix 40 to flow around abrasive particles 42 and make the height and surface roughness of abrasive coating 22 more uniform. This may reduce surface roughness of abrasive coating 22, improve incorporation of abrasive particles 44 in abrasive coating 22 such that abrasive particles 44 are less likely to be removed from abrasive coating 22 due to contact with an adjacent abradable coating, or both. Reduced surface roughness may improve a seal between a rotating component that includes multiple rotating elements and an adjacent stator or sealing component.

Figure 6:
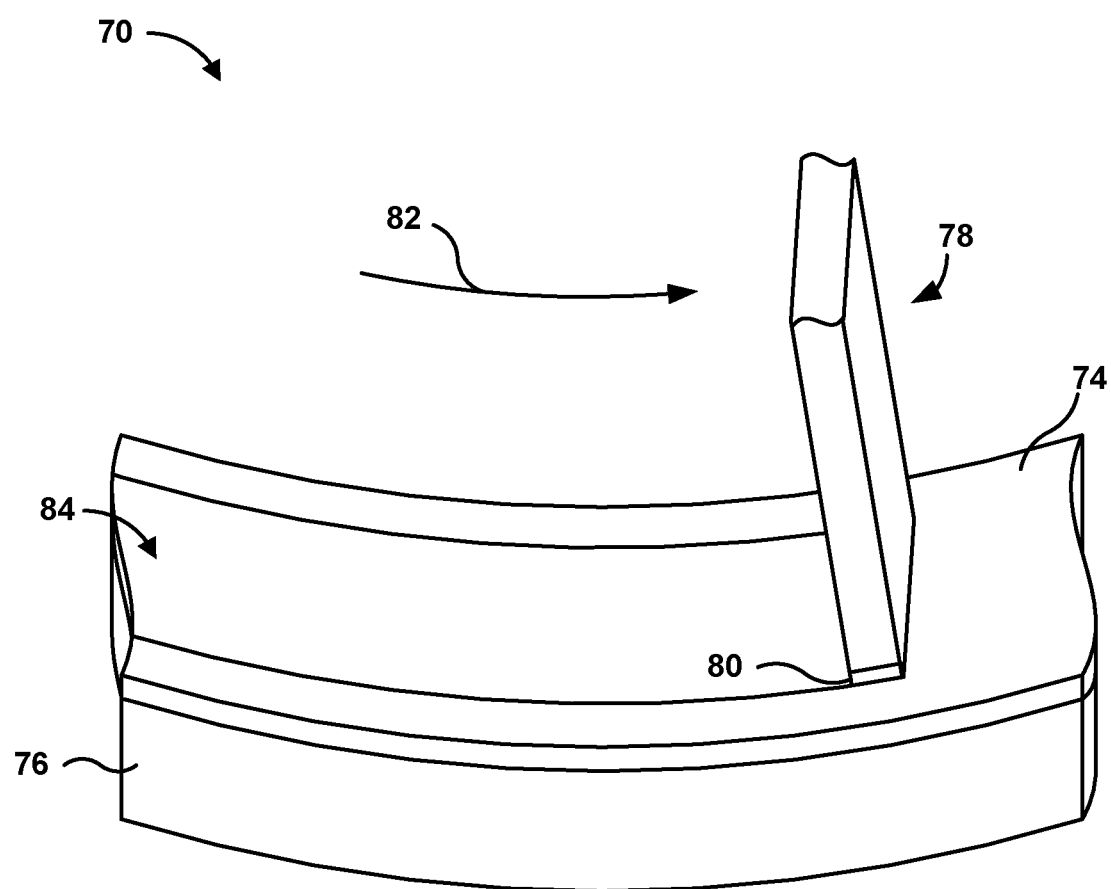
FIG. 6 is a conceptual diagram illustrating a system that includes a rotating component, an abrasive coating on the rotating component, and a stationary component adjacent the rotating component.

Abrasive coating 22 may be used as a coating on a substrate of a rotating component, e.g., in a mechanical system, to protect the substrate from damage due to intentional or unintentional contact with an adjacent component, such as a stator. As described above, the rotating component may include, for example, a pump rotor, a turbine blade, a compressor blade, a fan blade, a knife in a knife seal, or the like. FIG. 6 is a conceptual diagram illustrating a system 70 that includes a rotating component 78, an abrasive coating 80 on rotating component 78, and a stationary component 76 adjacent rotating component 78. In the example of FIG. 6, system 70 is a gas turbine engine and rotating component 78 is a rotating blade (e.g., a compressor blade or a turbine blade) of the gas turbine engine.

System 70 includes stationary component 76, which may be a blade track or blade shroud. Abrasive coating 80 is on a tip or radially outer surface of rotating component 78, and is configured to impact an abradable coating 74 on stationary component 76 during at least some operating conditions of system 70. Although a single rotating component 78 is shown in system 70 for ease of description, in actual operation, system 70 may include a plurality of rotating components.

During operation of system 70, rotating component 78 rotates relative to stationary component 76 in a direction indicated by arrow 82. In general, the power and efficiency of system 70 can be increased by reducing the gap between stationary component 76 and rotating component 78, e.g., to reduce or eliminate gas leakage around a tip of rotating component 78. Thus, system 70, in various examples, is configured to allow rotating component 78 to abrade into abradable coating 74 on stationary component 76 to define an abraded portion 84, which creates a seal between abradable coating 74 and rotating component 78. The abrading action may create high thermal and shear stress forces at abrasive coating 80.

In some examples, the disclosure may be described by the following clauses.

Clause 1. A method comprising: controlling, by a computing device, a powder source to deliver metal powder to a powder delivery device; controlling, by the computing device, the powder delivery device to deliver the metal powder to a surface of an abrasive coating; and controlling, by the computing device, an energy delivery device to deliver energy to at least one of the abrasive coating or the metal powder to cause the metal powder to be joined to the abrasive coating.

Clause 2. The method of clause 1, wherein joining the metal powder to the abrasive coating reduces an average surface roughness of the abrasive coating.

Clause 3. The method of clause 1 or 2, wherein the metal powder joined to the abrasive coating further encapsulated at least some of the abrasive particles.

Clause 4. The method of any one of clauses 1 to 3, wherein the abrasive coating comprises a metal matrix and abrasive particles at least partially encapsulated in the metal matrix.

Clause 5. The method of clause 4, wherein the metal powder comprises a composition substantially similar to the metal matrix.

Clause 6. The method of clause 4 or 5, wherein the metal matrix comprises a Ni- or Co-based alloy.

Clause 7. The method of any one of clauses 1 to 6, wherein the abrasive particles comprise at least one of a metal nitride, a metal carbide, or a metal oxide.

Clause 8. The method of any one of clauses 1 to 7, wherein the energy delivery device comprises a laser or a plasma source.

Clause 9. The method of any one of clauses 1 to 8, wherein the powder delivery device comprises a blown powder deposition device.

Clause 10. A system comprising: a powder source; a powder delivery device; an energy delivery device; and a computing device, wherein the computing device is configured to: control the powder source to deliver metal powder to the powder delivery device; control the powder delivery device to deliver the metal powder to a surface of an abrasive coating; and control the energy delivery device to deliver energy to at least one of the abrasive coating or the metal powder to cause the metal powder to be joined to the abrasive coating.

Clause 11. The system of clause 10, wherein joining the metal powder to the abrasive coating reduces an average surface roughness of the abrasive coating.

Clause 12. The system of clause 10 or 11, wherein the metal powder joined to the abrasive coating further encapsulated at least some of the abrasive particles.

Clause 13. The system of any one of clauses 10 to 12, wherein the abrasive coating comprises a metal matrix and abrasive particles at least partially encapsulated in the metal matrix.

Clause 14. The system of clause 13, wherein the metal powder comprises a composition substantially similar to the metal matrix.

Clause 15. The system of clause 13 or 14, wherein the metal matrix comprises a Ni- or Co-based alloy.

Clause 16. The system of any one of clauses 10 to 15, wherein the abrasive particles comprise at least one of a metal nitride, a metal carbide, or a metal oxide.

Clause 17. The system of any one of clauses 10 to 16, wherein the energy delivery device comprises a laser.

Clause 18. The system of any one of clauses 10 to 17, wherein the powder delivery device comprises a blown powder deposition device.

Clause 19. A computer-readable storage device comprising instructions that, when executed, configure one or more processors of a computing device to: control a powder source to deliver metal powder to a powder delivery device; control the powder delivery device to deliver the metal powder to a surface of an abrasive coating; and control an energy delivery device to deliver energy to at least one of the abrasive coating or the metal powder to cause the metal powder to be joined to the abrasive coating.

Clause 1. A method comprising: controlling, by a computing device, an energy delivery device to deliver energy to an abrasive coating, wherein the abrasive coating comprises a metal matrix and abrasive particles at least partially encapsulated by the metal matrix; and controlling, by the computing device, the energy delivery device to scan the energy across a surface of the abrasive coating and form a series of softened or melted portions of the metal matrix.

Clause 2. The method of clause 1, wherein the softened or melted portions of the metal matrix allow the metal matrix to further encapsulate at least some of the abrasive particles.

Clause 3. The method of clause 1 or 2, wherein the softened or melted portions of the metal matrix allow surface tension or surface energy to cause the softened or melted portions of the metal matrix to flow between abrasive particles.

Clause 4. The method of any one of clauses 1 to 3, wherein the method reduces an average surface roughness of the abrasive coating.

Clause 5. The method of any one of clauses 1 to 4, wherein additional metal powder is not delivered to the metal matrix as the energy delivery device delivers energy to the abrasive coating.

Clause 6. The method of any one of clauses 1 to 5, wherein the metal matrix comprises a Ni- or Co-based alloy.

Clause 7. The method of any one of clauses 1 to 6, wherein the abrasive particles comprise at least one of a metal nitride, a metal carbide, or a metal oxide.

Clause 8. The method of any one of clauses 1 to 7, wherein the energy delivery device comprises at least one of a laser or a plasma.

Clause 9. The method of any one of clauses 1 to 8, further comprising: controlling, by the computing device, a powder source to deliver metal powder to a powder delivery device; controlling, by the computing device, the powder delivery device to deliver the metal powder to a surface of an abrasive coating; and controlling, by the computing device, the energy delivery device to deliver energy to at least one of the abrasive coating or the metal powder to cause the metal powder to be joined to the abrasive coating.

Clause 10. A system comprising: an energy delivery device; and a computing device, wherein the computing device is configured to: control the energy delivery device to deliver energy to an abrasive coating, wherein the abrasive coating comprises a metal matrix and abrasive particles at least partially encapsulated by the metal matrix; and control the energy delivery device to scan the energy across a surface of the abrasive coating and form a series of softened or melted portions of the metal matrix.

Clause 11. The system of clause 10, wherein the softened or melted portions of the metal matrix allow the metal matrix to further encapsulate at least some of the abrasive particles.

Clause 12. The system of clause 10 or 11, wherein the softened or melted portions of the metal matrix allow surface tension or surface energy to cause the softened or melted portions of the metal matrix to flow between abrasive particles.

Clause 13. The system of any one of clauses 10 to 12, wherein the method reduces an average surface roughness of the abrasive coating.

Clause 14. The system of any one of clauses 10 to 13, wherein additional metal powder is not delivered to the metal matrix as the energy delivery device delivers energy to the abrasive coating.

Clause 15. The system of any one of clauses 10 to 14, wherein the metal matrix comprises a Ni- or Co-based alloy.

Clause 16. The system of any one of clauses 10 to 15, wherein the abrasive particles comprise at least one of a metal nitride, a metal carbide, or a metal oxide.

Clause 17. The system of any one of clauses 10 to 16, wherein the energy delivery device comprises at least one of a laser or a plasma.

Clause 18. The system of any one of clauses 10 to 17, further comprising: a powder source; and a powder delivery device, wherein the computing device is further configured to: control the powder source to deliver metal powder to the powder delivery device; control the powder delivery device to deliver the metal powder to a surface of an abrasive coating; and control the energy delivery device to deliver energy to at least one of the abrasive coating or the metal powder to cause the metal powder to be joined to the abrasive coating.

Clause 19. A computer-readable storage device comprising instructions that, when executed, configure one or more processors of a computing device to: control an energy delivery device to deliver energy to an abrasive coating, wherein the abrasive coating comprises a metal matrix and abrasive particles at least partially encapsulated by the metal matrix; and control the energy delivery device to scan the energy across a surface of the abrasive coating and form a series of softened or melted portions of the metal matrix.

Clause 20. The computer-readable storage device of clause 19, further comprising instructions that configure one or more processors of the computing device to: control a powder source to deliver metal powder to a powder delivery device; control the powder delivery device to deliver the metal powder to a surface of an abrasive coating; and control an energy delivery device to deliver energy to at least one of the abrasive coating or the metal powder to cause the metal powder to be joined to the abrasive coating.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
controlling, by a computing device, after deposition of an abrasive coating, an energy delivery device to scan energy to a surface of the abrasive coating, wherein the abrasive coating comprises a metal matrix and abrasive particles at least partially encapsulated by the metal matrix; and controlling, by the computing device, the energy delivery device to scan the energy across the surface of the abrasive coating to re-melt or reflow the metal matrix.

2. The method of claim 1, wherein re-melting or reflowing the metal matrix forms softened or melted portions of the metal matrix and allows the metal matrix to further encapsulate at least some of the abrasive particles.

3. The method of claim 2, wherein the softened or melted portions of the metal matrix allow surface tension or surface energy to cause the softened or melted portions of the metal matrix to flow between abrasive particles.

4. The method of claim 1, wherein the method reduces an average surface roughness of the abrasive coating.

5. The method of claim 1, wherein additional metal powder is not delivered to the metal matrix as the energy delivery device delivers energy to the abrasive coating.

6. The method of claim 1, wherein the metal matrix comprises a Ni- or Co-based alloy.

7. The method of claim 1, wherein the abrasive particles comprise at least one of a metal nitride, a metal carbide, or a metal oxide.

8. The method of claim 1, wherein the energy delivery device comprises at least one of a laser or a plasma.

9. The method of claim 1, further comprising:
controlling, by the computing device, a powder source to deliver metal powder to a powder delivery device;
controlling, by the computing device, the powder delivery device to deliver the metal powder to the surface of an abrasive coating; and
controlling, by the computing device, and subsequent to delivering the metal powder, the energy delivery device to deliver energy to at least one of the abrasive coating or the metal powder to cause the metal powder to be joined to the abrasive coating.

* * * * *